(No Model.)

W. W. WARD.
MOTOR FOR PUMPS.

No. 371,009. Patented Oct. 4, 1887.

WITNESSES:
C. Neveux
C. Sedgwick

INVENTOR:
W. W. Ward
BY Munn & Co.
ATTORNEYS.

UNITED STATES PATENT OFFICE.

WILLIAM W. WARD, OF EATON, OHIO, ASSIGNOR TO HIMSELF, JOHN R. COOK, AND C. A. McNEAL, ALL OF SAME PLACE.

MOTOR FOR PUMPS.

SPECIFICATION forming part of Letters Patent No. 371,009, dated October 4, 1887.

Application filed December 22, 1886. Serial No. 222,305. (No model.)

*To all whom it may concern:*

Be it known that I, WILLIAM W. WARD, of Eaton, in the county of Preble and State of Ohio, have invented a new and Improved Motor for Pumps, of which the following is a full, clear, and exact description.

My invention has for its object to provide a simple, effective, and inexpensive motor, useful for maintaining water-supply in dwellings and barns, or other structures, and adapted for pumping liquids generally.

The invention consists in certain novel features of construction and combinations of parts of the motor, all as hereinafter fully described and claimed.

Reference is to be had to the accompanying drawings, forming a part of this specification, in which similar letters of reference indicate corresponding parts in both figures.

Figure 1:
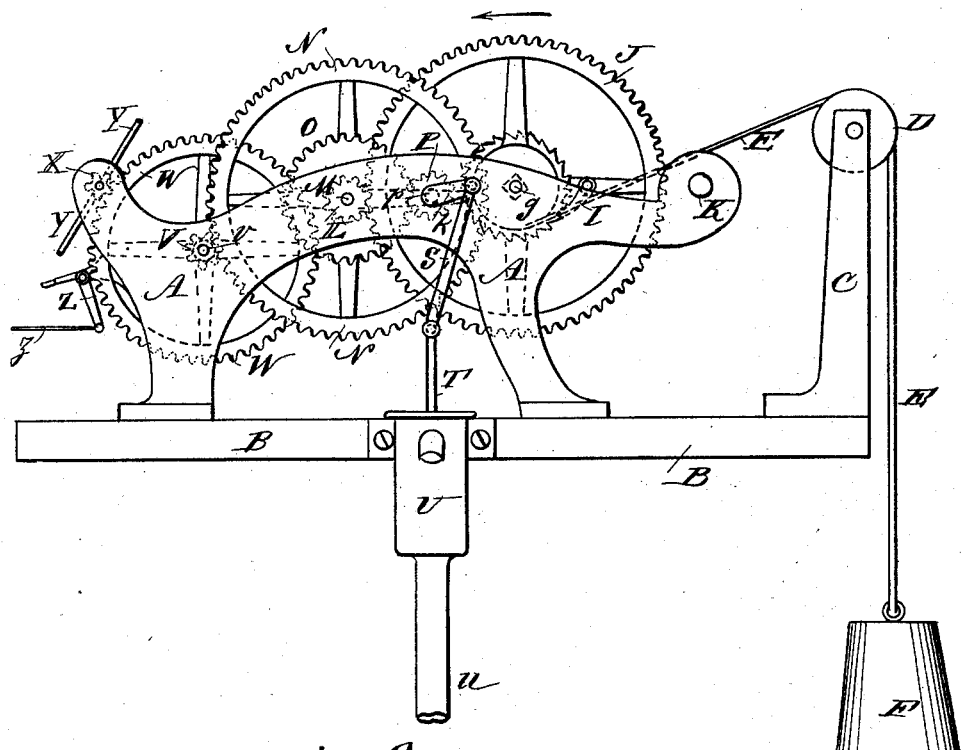
Figure 2:
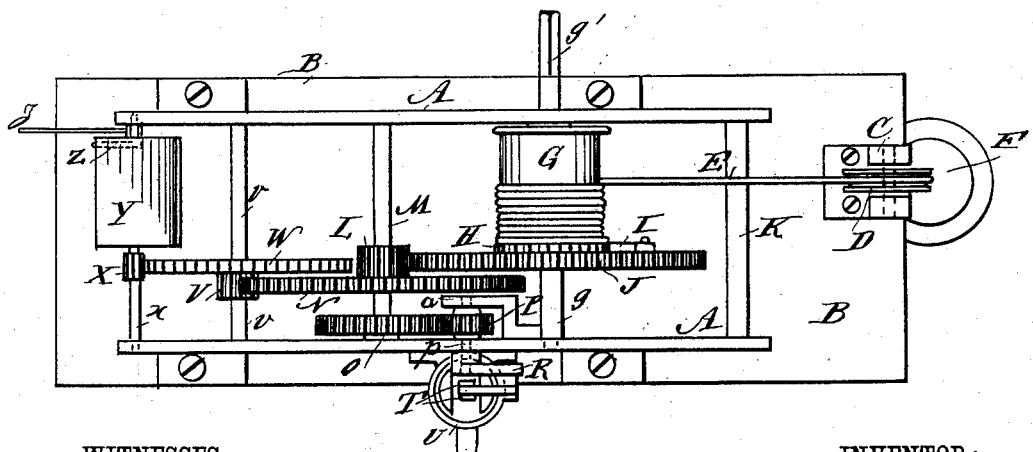

Figure 1 is a side elevation of my improved motor, and Fig. 2 is a plan view thereof.

The metal frame A, on which most of the mechanism of the pump is supported, is held, by bolting or otherwise, to a suitable bed-plate, B, to which is fixed a standard, C, at the head of which a pulley, D, is journaled. A rope, E, passing over this pulley, sustains a weight, F, at one end, and at its other end is connected to the winding-drum G of the pump-operating mechanism.

The drum G is fixed to a shaft, $g$, which is journaled in the opposite sides of the frame A, and to the drum is attached a ratchet-wheel, H, which is engaged by a pawl, I, pivoted to a gear-wheel, J, which is placed loosely on the shaft $g$, and whereby the weight-carrying rope E may be wound on the drum by applying a crank to the squared end $g'$ of the shaft $g$, and as the weight falls and unwinds the rope from the drum the spring-pressed pawl will be engaged by the drum-ratchet, and will cause the gear-wheel J to revolve in the direction of the arrow in Fig. 1 of the drawings. The rope E passes over an anti-friction roller, K, journaled to the frame. The gear-wheel J engages a toothed pinion L, which is fixed to a shaft, M, journaled in the frame, and to said shaft M also is fixed a gear-wheel, O, which meshes with a pinion, P, fixed to a shaft, $p$, journaled in the frame A and bracket $a$. To the shaft $p$, outside of the frame A, there is fixed a crank-arm, R, which is connected by a pitman, S, with the plunger-rod T of a pump, U, held to the frame, and which may have any usual or approved construction.

It is obvious that the turning of the first or prime motor gear-wheel, J, by the unwinding of the rope from the drum as the weight falls, will cause the reciprocation of the pump-plunger for drawing water or other liquid into which the pump-barrel $u$ is placed.

To give smoothness and steadiness of motion to the pump-rod, the gear-wheel N, also secured to the shaft M, is made to mesh into a pinion, V, which is fixed to a shaft, $v$, to which is also fixed a gear-wheel, W, and this wheel W meshes with a pinion, X, fast to a shaft, $x$, which is journaled in the frame A, and has fixed to it a fan, Y, and whereby as the mechanism of the pump is in action the fan will be revolved to offer necessary resistance to the air to control or regulate the operation of the whole machine. An elbow-lever, Z, pivoted to the frame A, may be drawn upon by a connected rod, $z$, secured to one of its arms, to throw the other arm of the lever into the path of the fan-wheel regulator, so that the fan will strike the said arm when it is desired to stop the machine at any time.

The pinion L and gear-wheel N may be made integral, if desired, as may also the gear-wheel W and pinion V.

To set the machine in motion, it is only necessary to wind the rope E onto the drum G, which may be done without operating the gearing, and then let the weight fall by its gravity and the pump will be operated until the weight runs down, and without requiring attention.

The machine may be set up at any place allowing sufficient fall to the weight. It is preferred, when pumping water from a well, to set the machine at the well-curb, so that the weight will fall down the well, which ordinarily will permit the use of a long rope for the weight, allowing the machine to run a long time without rewinding the rope on the drum.

This machine will be found very serviceable in dwellings and barns for use in maintaining water-supply for man and stock, and may be used in many other situations for pumping water or other liquids, and its operation entails little or no expense, and the machine is not likely to get out of order, and withal is quite inexpensive to make or set up in operative condition.

Having thus fully described my invention, what I claim as new, and desire to secure by Letters Patent, is—

The herein-described motor for pumps, comprising the frame, the shaft $g$, squared at $g'$, and having the gear-wheel J, provided with the pawl I, the drum G, loosely mounted on said shaft, having a ratchet, H, rope E, and weight F, the shaft M, having pinion L meshing with wheel J, and gear-wheels N O, the short shaft $p$, having a pinion, P, meshing with gear-wheel O, and a crank, R, connected with the pump-rod, the shaft $v$, having a pinion, V, meshing with gear N, and a gear-wheel, W, the shaft $x$, having a pinion, X, meshing with gear-wheel W, and having the fan-blade Y, and the bell-crank lever Z, having a rod connected to one arm for throwing its other arm into the path of the fan to be struck thereby when the machine is to be stopped, substantially as set forth.

WILLIAM W. WARD.

Witnesses:
FRANK STRAW,
CHAS. C. FOOS.